United States Patent

[11] 3,604,850

[72] Inventors Robert Roy Eckenbrecht
East Bethany;
Charles Bailey Neal, Batavia; Dong Woo Rhee, Williamsville, all of, N.Y.

[21] Appl. No. 28,864
[22] Filed Apr. 15, 1970
[45] Patented Sept. 14, 1971
[73] Assignee Sylvania Electric Products, Inc.

[54] VARIABLE SPEED CONTINUOUS MOTION FILM AND TELEVISION SCAN SYNCHRONIZATION
26 Claims, 3 Drawing Figs.

[52] U.S. Cl. 178/7.2 D
[51] Int. Cl. H04n 5/36
[50] Field of Search 178/5.2 D, DIG. 28, 7.1 R, 7.2 R

[56] References Cited
UNITED STATES PATENTS

| | | | |
|---|---|---|---|
| 2,523,156 | 9/1950 | Somers | 178/7.2 D |
| 2,922,841 | 1/1950 | Graziano | 178/7.2 X |

*Primary Examiner*—Robert L. Richardson
*Attorneys*—Norman J. O'Malley, Robert E. Walrath and Thomas H. Buffton

ABSTRACT: A system is provided for deriving images from a film of film frames, either motionless or continuously and bidirectionally movable at different speeds, and effecting translation between the different film frame speeds and the scanning frequency of a display device whereon the derived images are displayed. A flying spot scanner system is employed wherein a film of film frames is continuously advanced through a film scanning zone, the film frames are detected to provide a pair of vertical scan modification signals, a selector means switches from one to the other of the modification signals in accordance with the positional location of the film frames within the film scanning zone and the retrace period of the vertical scanning signals, and the vertical scan and vertical scan modification signals are combined and applied to the flying spot scanner system to vertically modulate electron beam scanning in accordance with film movement.

INVENTORS.
ROBERT R. ECKENBRECHT,
CHARLES B. NEAL, &
DONG WOO RHEE
BY Robert E. Walrath
ATTORNEY

PATENTED SEP 14 1971 3,604,850

INVENTORS.
ROBERT R. ECKENBRECHT,
CHARLES B. NEAL, &
DONG WOO RHEE

BY Robert E. Walrath
ATTORNEY

VARIABLE SPEED CONTINUOUS MOTION FILM AND TELEVISION SCAN SYNCHRONIZATION

CROSS-REFERENCE TO OTHER APPLICATIONS copending application entitled "Color Image Display System" having Ser. No. 787,963 now Pat. No. 3,569,613 and filed Dec. 30, 1968, suggests a combined television receiver and flying spot scanner system employing film movement unobservable to a viewer is achieved during the combined period of vertical blanking and a period of vertical overscan. Also, copending application entitled "Color Image Display System Employing Altered Scanning" having Ser. No. 787,725 filed Dec. 30, 1968, provides apparatus for modifying the vertical scanning of a flying spot scanner tube in a manner such that the modified vertical scanning coincides with movement of a film frame through a scanning zone. Further, copending applications entitled "Continuous Electronic Film Scanner" filed Feb. 13, 1970, having Docket Numbers 4701 and 5762 and Ser. Nos. 11171 and 11065 provide apparatus for continuously modifying the vertical scanning of a flying spot scanner tube in synchronization with a continuously moving film.

BACKGROUND OF THE INVENTION

Generally, "commerical"-type apparatus is required to derive image information from a film and provide a visual display of the image information on a television receiver. Usually, the "commercial"-type apparatus is in the form of a television camera and associated signal transmission apparatus for developing and transmitting a composite television signal. Also, a television receiver is employed to intercept and process the transmitted signal to provide the visual image display. Thus, a complete commercial transmitting studio and television receiver is required and such facilities are far beyond the interest, technical capabilities and desired expenditures of an average "consumer" interested in television and film image displays.

In addition to the above-mentioned technique which employs some form of image storage device, such as an image orthicon, other known forms of image scanning systems include the so-called "flying spot scanner" system. Therein, a flying spot scanner tube provides a light beam which scans a film to provide image signals which are detected and processed for utilization in an image display device.

A major problem area associated with systems utilizing a flying spot scanner, film, and a television receiver for displaying image information derived from the film is the area of synchronization of film movement and electron beam scanning of the flying spot scanner tube and picture tube of the receiver. As is well known, vertical or field scanning in a television receiver is normally at a rate of about 60 Hz. while film frame speeds are usually in the range of about 18–24 Hz. Since the receiver scanning rate is not conveniently divisible by the film frame rate, synchronization therebetween becomes a problem.

Further, known film transport systems are of either the intermittent or continuous motion type and systems for deriving the image information from the film are either optical or electronic in nature. More specifically, several forms of intermittent-type film motion systems are disclosed in the previously mentioned applications having Ser. Nos. 787,725 and 787,963. Also, several forms of continuous-type film motion systems are disclosed, as previously mentioned, in copending applications entitled "Continuous Electronic Film Scanner" having Ser. Nos. 11171 and 11065

Additionally, optical systems include the well known lap-dissolve systems with rotating prism or moving mirrors. The lap-dissolve system which provides a gradual appearance of one scene while another scene gradually disappears utilizes prism or mirror motion in an attempt to immobilize the film insofar as a viewer or image detector is concerned. In any event, both systems are undesirably expensive and undesirably employ differing optical paths which tend to deleteriously affect image reproduction.

OBJECTS AND SUMMARY OF THE INVENTION

An object of the present invention is to provide an enhanced system for visually displaying images derived from film. Another object of the invention is to provide improved apparatus for synchronizing vertical scanning of a film movable at a given rate through a film scanning of a film movable at a given rate through a film scanning zone with a device for displaying images derived from the film. Still another object of the invention is to provide improved apparatus for vertically modifying film scanning in accordance with film travel through a film scanning zone. A further object of the invention is to provide and enhanced system for scanning still and bidirectional variable-rate continuously moving film images and producing signals suitable for control of an image display. A still further object of the invention is to provide improved apparatus for effecting translation between the variable frame rates of a continuously moving film of film frames and the field rate of television system. These and other objects, advantages and capabilities are achieved in one aspect of the invention by a system having an image display device scanned at a given vertical scanning frequency and means for scanning a film while continuously advancing the film of film frames through a film scanning zone and including synchronizing apparatus in the form of a means for developing vertical scanning signals at the given vertical scanning frequency, means associated with film scanning and the vertical signal development means for developing a vertical scan modification signal derived from dual-time-spaced signals representing positional location of successive frames of film in the film scanning zone and means for combining the vertical scan and vertical scan modification signals to provide a composite vertical scan and vertical scan modification signal for application to a film scanning means for synchronized scanning of a display device and a film scanner and modulation of film scanning at a rate substantially equal to the rate of film advancement to cause the reproduced image to appear stationary.

PREFERRED EMBODIMENT OF THE INVENTION

For a better understanding of the present invention, together with other and further objects, advantages, and capabilities thereof, reference is made to the following disclosure and appended claims in connection with the above-described drawings.

Figure 1:
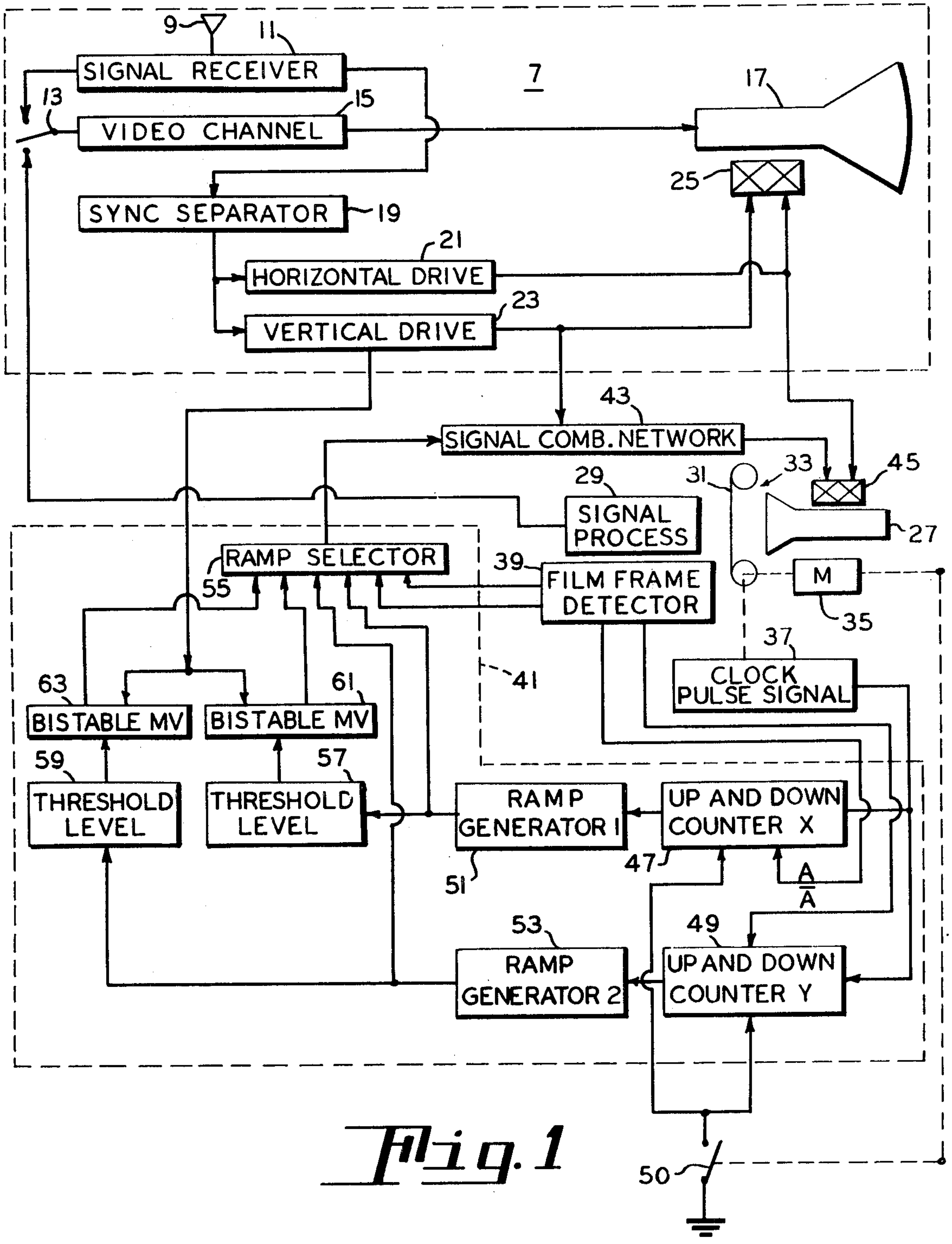
FIG. 1 is an illustration, in block form, of apparatus for deriving image signals from film for providing a visual image display on a television receiver.

Referring to the drawings, FIG. 1 illustrates apparatus suitable to the visual display of an image derived from a film. The apparatus includes a television receiver 7 having an antenna 9 for intercepting television signals with a signal receiver stage 11 coupled to the antenna 9. A switch 13 selectively connects the signal receiver stage 11 to a video channel 15 coupled to a display device or television picture tube 17. A synchronizing pulse separator stage 19 is connected to the signal receiver 11 and provides synchronizing signals at horizontal (15,750 Hz.) and vertical (60 Hz.) frequencies which are applied to horizontal and vertical drive circuitry, 21 and 23 respectively. In turn, the horizontal and vertical drive circuitry, 21 and 23, is coupled to the deflection apparatus 25 associated with the picture 17.

The apparatus also includes a flying spot scanner system having a flying spot scanner tube 27 and an image detection and processing network 29 disposed on opposite sides of a film of film frames 31 forming a film scanning zone 33. Electrical signals representative of image information on the film are coupled from the image detection and process network 29 to the switch 13 of the television receiver to provide selective viewing of images derived from the film 31 or television signals intercepted by the antenna 9.

The film of film frames 31 is continuously moved through the film scanning zone 33 by a transport means 35 which, in turn, is coupled to a clock pulse signal generator 37 and associated with a film frame detector 39. The clock pulse signal generator 37 is preferably, not necessarily, in the form of a strobe disc driven by a capstan of the transport means 35 and disposed intermediate a light source and light detector means and provides a plurality of so-called "clock " pulses. The film frame detector 39 detects each frame of film, by sprocket hole location for instance, and includes a bistable means, such as a flip-flop or bistable multivibrator, for providing a pair of time spaced signals at a frequency of about one-half the film frame frequency.

A vertical scan modification means 41 is coupled to the clock pulse signal generator 37 and film frame detector 39 as well as to the vertical drive circuitry 23 of the television receiver 7. This vertical scan modification means 41 provides a resultant vertical scan modifying signal which is applied to a signal combining network 43. A signal from the vertical drive circuitry 23 of the television receiver 7 is also applied to the signal combining network 43 wherein is provided a composite vertical scan and vertical scan modification signal which is applied to deflection apparatus 45 associated with the flying spot scanner tube 27. The deflection apparatus 45 of the flying spot scanner tube 27 is also coupled to the horizontal drive circuitry 21 of the television receiver 7.

The vertical scan modification means 41 includes a pair of "up-down" counter chains, 47 and 49 respectively, coupled to the clock pulse signal generator 37, the film frame detector 39, and to circuit ground by a film reversing switch 50 coupled to the film transport means 35. In this instance, the counter chains, 47 and 49, each provide a binary output signal which is applied to first and second staircase ramp generators 51 and 53 which, in turn, are coupled to a ramp selector means 55. Moreover, the "up-down" counter chains, 47 and 49, and reversing switch 50 permit a reversal in positional location of the film frames 31 in the scanning zone 33.

Also, each of the staircase ramp generators 51 and 53 is coupled to a threshold level device 57 and 59, which may be a Schmidt trigger circuit or AND gate to detect the predesignated binary number of counter chains 47 and 49. The threshold level devices 57 and 59 are coupled to bistable multivibrators, 61 and 63 and each of the bistable multivibrators, 61 and 63, is coupled to the vertical drive circuit 23 of the television receiver 7. Thus, each of the multivibrators 61 and 63 provides an output signal which is applied to the ramp selector means 55.

As to operation, the apparatus provides normal television signal reception by positionally locating the switch 13 such that coupling is achieved between the signal receiver 11 and the video channel 15 of the television receiver 7. Thus, television signals intercepted by the antenna 9 appear as a visual display on the picture tube 17 of the television receiver 7.

To provide a visual image display derived from film, the switch 13 is positionally located to couple image detection and procession network 29 of the flying spot scanner system to the video channel 15 of the television receiver 7. Thus, images derived from the film appear as a visual image display on the picture tube 17 of the television receiver 7. Moreover, synchronizing signals are available from the signal receiver 11 when images are derived from a received image signal and when images are derived from the flying spot scanner system.

Generally, positionally locating the switch 13 to provide a visual image display derived from film causes activation of the transport means 35 of the flying spot scanner system, Thereupon, a film of film frames 31 is continuously moved through the film scanning zone 33. Also, activation of the transport means 35 causes development of a plurality of signals by the clock pulse generator 35 and the film frame detector 37 associated with the transport means 35.

A vertical scan modification means 41 is coupled and responsive to signals from the clock pulse generator 37 and film frame detector 39 to provide a resultant vertical scan modification signal derived from dual signals representing positional location of successive frames of film in a film scanning zone. This resultant vertical scan modification signal from the vertical scan modification means 41 is applied to the signal combining network 43. Also, the signal combining network 43 receives a vertical scan signal from the vertical drive circuitry 23 of the television receiver 7.

The combining network 43 processes the resultant continuously varying vertical scan modification signal and the vertical scan signal to provide a composite vertical scan and modification signal. This composite vertical scan and vertical scan modification signal is applied to deflection apparatus 45 associated with the flying spot scanner tube 27. In this manner, the electron beam scanning of the flying spot scanner tube 27 is vertically modulated at a rate substantially equal to the rate of film frame movement through the film scanning zone. Thus, the image on the film appears to be immobilized and a visual image display derived from the film 31 appears on the picture tube 17 of the television receiver 7.

More specifically, activation of the transport means 35 causes continuous advancement of the film of film frames 31 through the film scanning zone 33. Also, the activated transport means 35 caused development of a plurality of clock pulse signals by the clock pulse signal generator 37 which may be in the form of a strobe disc driven by the transport means 35 and disposed intermediate a light source and light detector for instance. Further, the film frame detector 39 is responsive to the film movement, as by detection of the sprocket holes, for example, to provide signals representative of the rate of film frame movement through the film scanning zone. Moreover, the film frame detector 39 includes a divider or bistable means, such as a flip-flop or bistable multivibrator, for providing a pair of time spaced output signals having a frequency of one-half the film frame rate of movements through the film scanning zone 33.

The time spaced output signals, usually referred to as "reset" signals and at a frequency of one-half the rate of film frame movement available from the film frame detector 39 and the clock pulse signals available from the clock pulse signal generator are applied to and control the operation of a pair of "up-down"counter chains 47 and 49. Each of the counter chains 47 and 49 provides an output signal, preferably in the form of binary logic information, which is applied to and controls the operation of one of a pair of first and second staircase ramp generators 51 and 53.

Staircase ramp generators or digital to analog converters responsive to binary logic information are well known in the art and a typical ramp generator includes a transistor and load resistor series connecting a potential source and a plurality of parallel coupled binary weighted resistors each connected to a binary logic output signal source. Moreover, each of the above-mentioned staircase ramp generators 51 and 53 provides a staircase ramp output signal time spaced with respect to one another, which is applied to a ramp selector means 55

At the same time, the time-spaced staircase ramp output signals from the staircase ramp generators 51 and 53 are also applied by way of threshold level means 57 and 59 and bistable means 61 and 63 to the ramp selector means 55. Moreover, each of the bistable means 61 and 63 is also coupled to the vertical drive circuitry 23 of the television receiver 7. When one of the staircase ramp output signals applied to the threshold level means 57 and 59 reaches a given threshold level, an output signal is applied to one of the bistable means 61 and 63 which switches one of the bistable means 61 and 63 to a "set-up" or "ready" state.

Each of the bistable means 61 and 63 is also receiving pulse signals at a vertical scan frequency from the vertical scan drive circuitry 23 of the television receiver 7. When one of the bistable means 61 and 63 is switched to a "ready" state upon reaching the threshold level by one of the staircase ramp signals applied thereto, a following pulse signal from the vertical drive circuitry 23 caused an output signal which, in turn, "readies" or "sets-up" the ramp selector 55.

The ramp selector 55 responds to signals from the film frame detector 39 and one of the bistable multivibrators 61 and 63 to effect selection of one of the dual staircase ramp signals provided by the staircase ramp generators 51 and 53. Thus, the ramp selector 55 provides a resultant staircase ramp signal which is developed by switching from one to the other of a pair of dual staircase ramp signals.

In turn, the resultant staircase ramp signal available from the ramp selector means 55 is applied to the signal combining network 43. This signal combining network 43 is also coupled to the vertical drive circuitry 23 of the television receiver 7 and receives a vertical scan signal therefrom. This vertical scan signal and a continuously varying vertical scan modification signal are combined to provide a composite vertical scan and vertical scan modification signal which is applied to and serves to control the vertical electron beam scanning of the flying spot scanner tube 27 of the flying spot scanner system.

Figure 2:
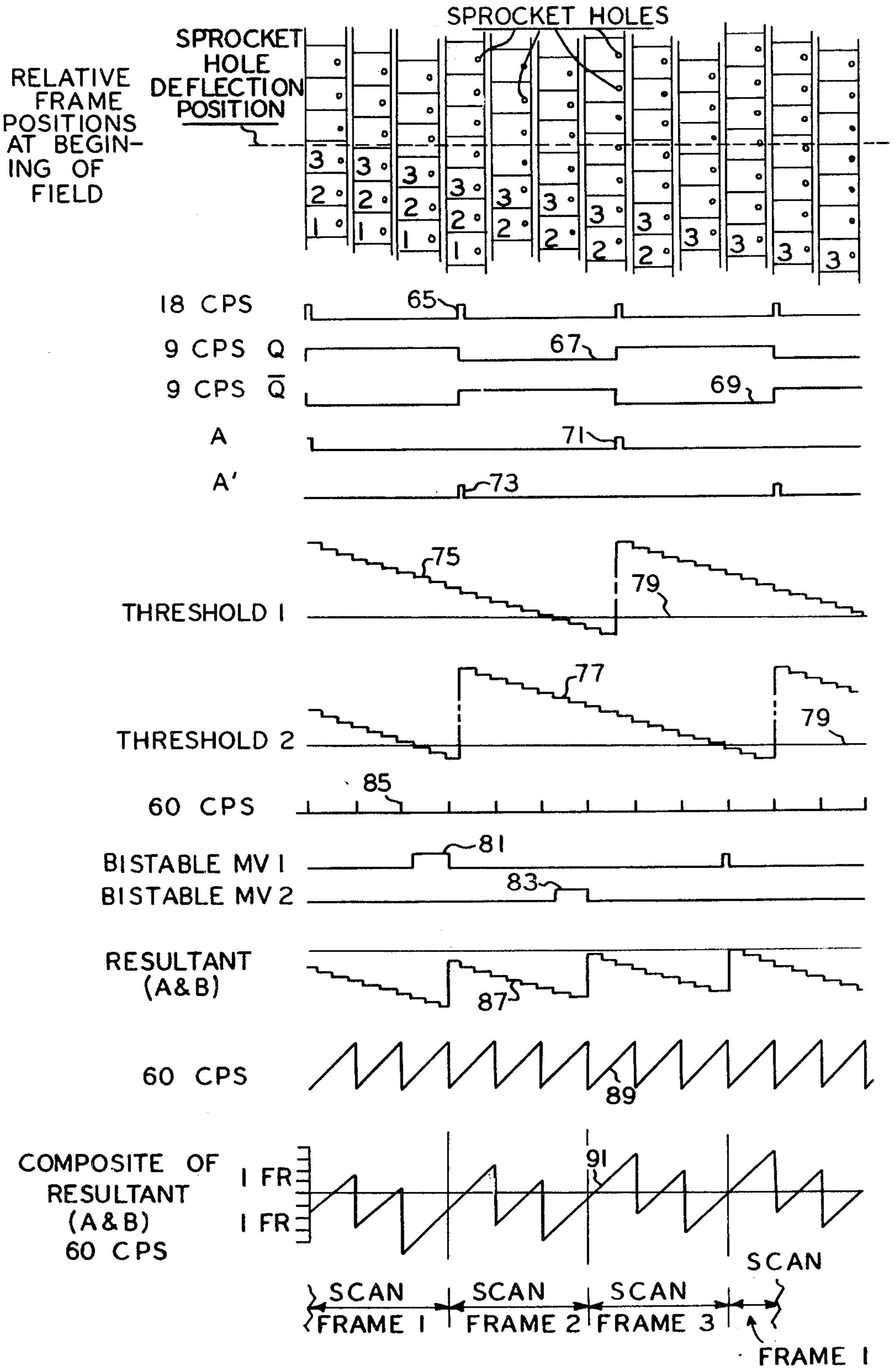
FIG. 2 is a graphic illustration of film movement and vertical modification signal development for providing a visual image display derived from a continuously moving film.

Referring to the graphic illustration of FIG. 2 in conjunction with the apparatus of FIG. 1, let it be assumed that a speed of 18 film frames per second has been selected. Thus, the film of film frames 31 is continuously moved through the film scanning zone 33 by the transport means 35 at the above-mentioned 18 film frames per second.

The film frame detector 39 is coupled to the transport means 35 and includes some means for detecting and providing an output signal representative of each frame of film. Thus, the film frame detector 39 provides an output signal, 65 of FIG. 2, having a frequency of 18 Hz. which is the rate of film frame travel through the film scanning zone.

Also, the film frame detector 39 includes some form of bistable means such as a flip-flop or bistable multivibrator. This bistable means responsive to the above-mentioned output signal at 18 Hz. provides a pair of output signal, usually referred to as Q and $\overline{Q}$ signals and labeled 67 and 69, having a frequency equal to one-half the film frame rate or about 9 Hz.

The output signals 67 and 69, having a frequency of about 9 Hz. are applied to the ramp selector 55, for purposes to be explained hereinafter, and are processed to provide a pair of detector output signals 71 and 73 at a frequency of about 9 Hz. and in time spaced relationship to one another. These time-spaced detector output signals 71 and 73 are often referred to as "reset" signals and are applied to a pair of counter chains 47 and 49 of a vertical scan modification means 41.

The clock pulse signal generator 37, also coupled to the transport means 35, provides a plurality of clock pulse signals which are applied to the pair of counter chains 47 and 49 of the vertical scan modification means 41. A preferred form of clock pulse generator is a strobe disc having a minimum frequency of about 500 times the film frame frequency in order to maintain desirable resolution.

The output of the counter chains 47 and 49 is preferably in the form of binary logic information in time-spaced relationship and suitable for application to first and second staircase ramp generators 51 and 53. The ramp generators 51 and 53 provide a pair of time-spaced staircase ramp output signals 75 and 77, with exaggerated steps for purposes of illustration, which are applied to a ramp selector 55 and to pair of threshold level means 57 and 59.

It should be noted that each one of the staircase ramp signals 75 and 77 extends for a period substantially equal to the time required for two film frames to travel through a film scanning zone regardless of the film speed. If one considers one ramp signal, 75 for instance, representative of odd-numbered film frames, it can be seen that utilization of a single ramp signal 75 would provide scanning of only the odd-numbered film frames since the ramp signal 75 is of two film frame duration.

Similarly, assuming the other ramp signal 77 represents only even-numbered film frames, it can be seen that utilization of a single ramp 77 would provide scanning of only the even-numbered film frames. Thus, it can be seen that switching from one to the other of the above-mentioned staircase ramp signals 75 and 77 to provide a resultant ramp signal, 87 of FIG. 2, provides for scanning of all film frames regardless of the film speed.

To accomplish the above-mentioned switching features and development of a resultant ramp signal 87, each of the ramp signals 75 and 77 is applied to a threshold level means 57 and 59 respectively. Each of the threshold level means 57 and 59 has a given threshold level, threshold 1 and 2 of FIG. 2, and an output signal is provided when the ramp signal reaches the threshold level. Thereupon, the threshold level means 57 and 59 "readies" or "setup" one of the bistable multivibrators 61 and 63.

Each of the bistable multivibrators 61 and 63 is also coupled to the vertical drive circuitry 23 of the television receiver 7. The drive circuitry 23 provides a 60 Hz. pulse signal 85 which is applied to both of the bistable multivibrators 61 and 63. However, this pulse signal 85 is ineffective until the multivibrator, 61 and 63 has been "readied" or "setup," as illustrated by curves 81 and 83, whereupon the pulse signal 85 following the "setting up" of the multivibrator provides an output signal which is applied to the ramp selector means 55. Thus, switching from one to the other of the staircase ramp signals 75 and 77 occurs only when activated by the vertical scan signal which is indicative of a vertical retrace period.

The ramp selector 55, which may be any one of a number of bistable devices, is such that the staircase ramp signal 75 is selected only when the output signal 67 of the film frame detector 39 is positive and the output signal 81 from the bistable multivibrator 61 changes from positive to zero in value. Similarly, staircase ramp signal 77 is selected only when the output signal 69 of the film frame detector 39 is positive and the out put signal 83 from the bistable multivibrator 63 changes from positive to zero. Thus, the ramp selector 55 acts in a manner somewhat similar to an and gate to provide a resultant staircase ramp signal 87 derived from dual ramp signals 75 and 77.

This resultant staircase ramp signal 87 provided by the staircase ramp selector 55 and a vertical scan signal 89 from the vertical scan circuitry 23 of the television receiver 7 are applied to a signal-combining network 43. Therein, a composite vertical scan and vertical scan modification signal 91 is derived and applied to the deflection apparatus 45 of the flying spot scanner tube 27 to effect vertical modulation of electron beam scanning in a manner substantially similar to the advancement of a film frame through the film frame scanning zone.

In summary, a system is provided for effecting synchronized vertical scanning of a picture tube and a film of film frames continuously advances through a film scanning zone at almost any given speed. A detector associated with the film provides a pair of output signals representing two successive film frames. These output signals are applied to counter chains which provide dual ramp signals time spaced with respect to one another with each ramp signal having a continuously varying magnitude representing a continuously varying magnitude representing a continuously varying positional location of one of the successive film frames in the film scanning zone.

The scanning of the film is vertically modulated along one of the pair of ramp signals at the same rate of vertical travel as the film until a threshold level representing a given positional location of the film frame in the film scanning zone is attained. Thereupon, the modulation of vertical scanning would normally be shifted to the other ramp signal to effect scanning of a second frame of film.

However, it is highly undesirable to effect a shift in vertical modulation at any time other than a vertical retrace period since the retrace would be observable to a viewer. Thus, the switching from one to the other of the ramp signals is delayed until activated by vertical scan pulse signal indicative of a retrace period.

Also, it would obviously be improper to effect a switch in vertical scanning back to the original positional location of the second frame of film since the second film frame has moved vertically along with the vertical movement of the first film frame. However, the second ramp signal has tracked the movement of the second film frame and has a magnitude representative of the positional location of the second film frame in the film scanning zone. Thus, switching from one ramp signal to the other has no adverse effect upon vertical scan modification signals because of this tracking feature. Also, delaying of switching until a period of vertical retrace occurs has no deleterious effect upon the ramp switching feature.

The system provides a pair of time spaced ramp signals each representing the positional location of successive frames of film in a film scanning zone. The scanning of a continuously moving film is vertically modulated along one of the pair of ramp signals until a given positional location of the film in the film scanning zone is attained. Upon reaching the positional location, the system is "readied" and switched to the other ramp signal upon occurrence of the next vertical scan signal indicative of a retrace period. Thus, the film-tracking system provides an integral number of scans for each film frame regardless of the film speed and synchronized scanning of the film and of the picture tube.

Figure 3:
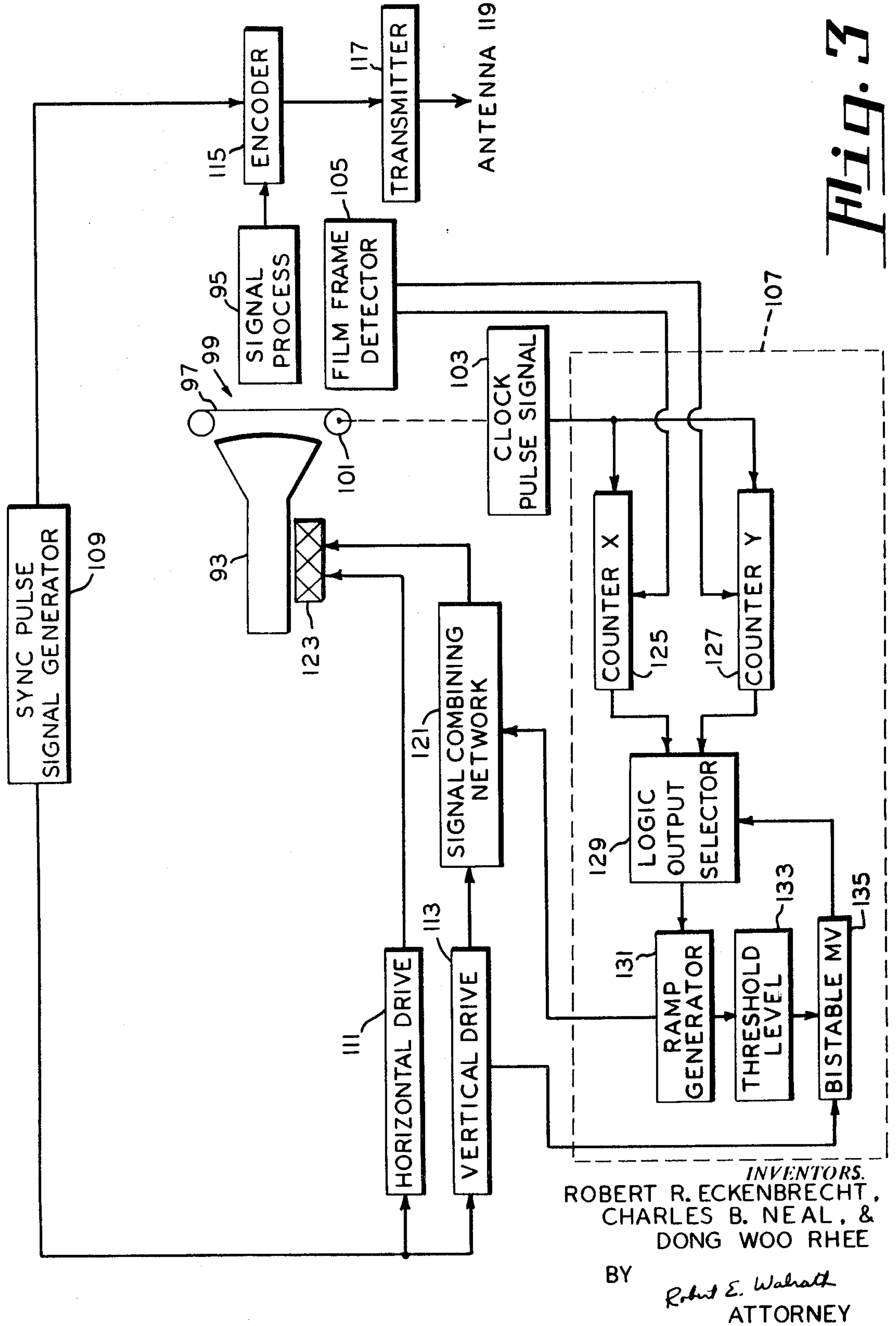
FIG. 3 is an alternate illustration, in block form, of apparatus for deriving image signals from film suitable for providing a visual image display on a television receiver.

Alternatively, FIG. 3 illustrates a preferred form of apparatus for effecting development of signals derived from a film and suitable for application to a television receiver for providing a visual image display. Therein, a flying spot scanner system includes a flying spot scanner tube 93 and a signal detecting and processing network 95 is disposed upon opposite sides of a film of film frames 97 and forming a film scanning zone 99.

A transport means 101 continuously advance the film of film frames 97 through the film scanning zone 99 at some desired film frame rate. A "clock" pulse generator 103 is coupled to the transport means 101 and provides a plurality of so-called "clock" pulses in a manner well known in the art. Also, a film frame detector 105 is associated with the film of film frames 97 and derives a signal representative of each frame of film. The film frame detector 105 also includes a bistable means responsive to the derived signals representative of each film frame and provides a pair of time spaced signals directly related to the rate of film frame travel through the film scanning zone but at one-half frequency. Thus, "clock" pulse signals from the clock pulse generator 103 and a pair of time spaced signals at one-half the frequency of the film frame movement derived by the film frame detector 105 are applied to a vertical scan modification means 107.

Digressing, the apparatus includes a synchronizing pulse signal generator 109 which serves as an activating and synchronizing source for horizontal drive circuitry 111 and vertical drive circuitry 113. Also, the pulse signal generator 109 provides synchronizing, blanking, and subcarrier signals which are applied to a signal encoder 115. The signal encoder 115 is also coupled to the signal detection and processing network 95 of the flying spot scanner system and applies signals representative of image information, subcarrier, blanking, and synchronizing information to a transmitter 117 which, in turn, is coupled to a transmitting antenna 119.

Referring back to the vertical scan modification means 107, the dual time spaced signals representative of successive film frame positions in the film scanning zone derived from the film frame detector 105 and signals from the vertical drive circuitry 113 are utilized to selectively switch the dual time spaced signals during a period of vertical retrace of the vertical scan signals to provide a resultant vertical scan modification signal representing positional location of successive frames of film in the film scanning zone.

This resultant vertical scan modification signal available from the vertical scan modification means 107 is applied to a signal combining network 121. The signal combining network 121 also receives a signal from the vertical drive circuitry 113. Therein, the vertical scan signals and the vertical scan modification signals are combined to provide a composite vertical scan and vertical scan modification signal which is applied to deflection apparatus 123 associated with the flying spot scan tube 93.

Again, referring back to the vertical scan modification means, 107, a pair of "up-down" counter chains 125 and 127, which may be in the form of ten divide by two counter stages, for instance, are coupled to and receive signals from the clock pulse signal generator 103 and the film frame detector 105. Each of the counter chains 125 and 127 provides binary logic information in time spaced relationship to one another in response to the dual time spaced signals provided by the film frame detector 105. In turn, the logic information from both of the counter chains 125 and 127 is applied to a logic output selector means 129.

The logic output selector means 129 provides an output logic signal which is applied to a ramp generator 131. Therein, a ramp signal is developed which is applied to the signal combining network 121 and to a threshold level device 133.

The threshold level device 133 which may be in the form of a Schmidt trigger circuit, a direct binary readout system, a time delayed sprocket hole detector or any one of numerous devices for indicating positional location of the film in the film scanning zone, "readies" or "arms" a bistable multivibrator stage 135.

The bistable multivibrator stage 135 is also coupled to the vertical drive circuitry 113 wherefrom is applied a plurality of vertical drive signals at a frequency equal to the vertical scanning frequency of an image display device. After "arming" of the multivibrator stage 135 by the threshold level device 133, the next occurring signal from the vertical drive circuitry 113 caused development of an output signal from the multivibrator stage 135 which switches the output signal from the logic output selector from one mode to another in accordance with binary logic information derived from the counter chains 125 and 127. Thus, the ramp generator 131 provides a resultant staircase ramp signal, 87 of FIG. 2, in accordance with binary logic information derived from one of two counter chains 125 and 127.

It should perhaps be noted that in this instance, FIG. 3, it is the binary logic information which is shifted in accordance with a given threshold level of the staircase ramp signal rather than the development and shift intermediate a dual pair of staircase ramp signals. Moreover, it has been found that a shift in binary logic sources is more precise and definite than a shift from one to the other of a pair of dual ramp signals due to the inherent variations in components necessary to the development of the dual staircase ramp signals.

Further, it may be noted that the above-described system is particularly applicable to a range of film frame speeds and provides continuously varying vertical scanning at substantially the same rate as the continuously varying film travel. Moreover, the number of vertical scans provided for each film frame varies in accordance with the film frame rate and the vertical scanning rate of the television receiver.

While there have been shown and described what is at present considered the preferred embodiments of the invention, it will be obvious to those skilled in the art that various changes and modifications may be made therein without departing from the invention as defined by the appended claims.

1. In a system having a means for deriving signals representing images from a film of film frames continuously advanced through a film scanning zone, apparatus for modulating vertical scanning of the film to effect synchronization of vertical scanning of the film and of an image display device, said apparatus comprising in combination:

means for developing vertical scanning signals having a given frequency of scanning substantially equal to the frequency of vertical scanning of an image display device;

means for developing vertical scan modification signals, said means being associated with said advancement of film through said film scanning zone and coupled to said means for developing vertical scanning signals at a given frequency and including means responsive to said continuously advancing film for providing dual time spaced signals representative of positional location of successive frames of film in said film scanning zone and means for switching from one to the other of said dual time spaced signals in accordance with the positional location of a frame of film in said film scanning zone and a signal from said vertical scanning signal development means whereby is provided a resultant vertical scan modification signal representing film frame positional location in a film scanning zone and having a retrace period coincident with the retrace period of the vertical scan signal; and means coupled to said vertical scan and vertical scan modification means for combining said signals to provide a composite vertical scan and vertical scan modification signal and for applying said composite vertical scan and vertical scan modification signal to said means for deriving images from a film of film frames whereby synchronized vertical scanning of said film and an image display device is effected.

2. The combination of claim 1 wherein said means responsive to said continuously advancing film for providing dual time spaced signals includes a film frame detector means associated with said film and providing signals representative of each film frame.

3. The combination of claim 1 including a second switching means coupled to said film frame advancement means and intermediate said vertical scan modification signal development means and a potential reference level for selectively affecting directional reversal of film advancement.

4. The combination of claim 1 wherein said means responsive to said continuously advancing film of said means for developing vertical scan modification signals includes a film frame detector means associated with said film and having a divider means for providing dual output signals time spaced with respect to one another and at a frequency directly related to the rate of film frame advancement through said film scanning zone.

5. The combination of claim 4 wherein said dual output signals are at a frequency of about one-half the rate of film frame advancement through said film scanning zone.

6. The combination of claim 1 wherein said means for developing vertical scan modification signals includes a source of clock pulse signals associated with and responsive to said continuously advancing film through said film scanning zone.

7. The combination of claim 1 wherein said means for developing vertical scan modification signals includes detector means and a clock pulse signal source associated with said film advancement through said film scanning zone and dual signal development means coupled and responsive to said detector means and clock pulse signal source for providing a pair of signals representing positional location of successive film frames in said film scanning zone.

8. The combination of claim 7 wherein said dual signal development means is in the form of a pair of counter chains each coupled to said film frame detector means and said clock pulse signal source.

9. The combination of claim 7 wherein said dual signal development means provides signals in the form of binary logic information.

10. The combination of claim 7 including means responsive to said dual signal development means for developing at least one ramp signal having a slope which varies at a rate substantially equal to the positional variation of a frame of film in said film frame scanning zone.

11. The combination of claim 7 including means responsive to said dual signal developing means for providing a pair of staircase ramp signals.

12. The combination of claim 1 wherein said means for developing vertical scan modification signals includes at least one threshold means responsive to the magnitude of at least one of said dual time spaced signals for effecting switching from one to the other of said signals.

13. The combination of claim 1 wherein said means for providing dual time spaced signals of said means for developing vertical scan modification signals provides said dual time spaced signals in the form of binary logic information and said switching means switches from one to the other of said binary logic information signals.

14. The combination of claim 1 wherein means for switching from one to the other of said dual time spaced signals of said means for developing vertical scan modification signals is responsive to the positional location of a film frame in said film scanning zone and a signal from said vertical scan signal development means.

15. Apparatus having a given scanning frequency for visually displaying images derived from a continuously moving film of film frames on an image display device comprising in combination:

source of synchronizing pulse signals;

horizontal and vertical drive signal circuitry coupling said pulse signal generator to said visual image display device;

flying spot scanner means including a flying spot scanner tube, a film scanning zone, means for continuously advancing a film of film frames through said scanning zone, and image signal detection and processing means;

vertical scan modification signal development means associated with said film advancing means and said vertical scan drive circuitry providing dual time spaced modification signals representing positional location of successive film frames in said film frame scanning zone and selectively switching from one to the other of said dual time spaced vertical scan modification signals in accordance with positional location of a film frame in the film scanning zone and a vertical scan signal;

signal-combining network means coupling said vertical scan drive signal circuitry and said vertical scan modification signal development means to said flying spot scanner means to effect modulation in vertical scanning at a rate dependent upon the rate of film frame advancement through said film scanning zone; and encoder means coupled to said source of synchronizing pulse signals and to said image signal detection and processing means for providing electrical signals suitable for display on an image display device.

16. The combination of claim 15 wherein said image signal detection and processing means of said flying spot scanner means provides electrical signals representative of color information derived from said film.

17. The combination of claim 15 including a color signal encoder coupled to said synchronizing pulse signal generator and said image signal detection and processing means and a color signal transmitter coupled to said encoder whereby a transmittable composite color television signal is provided.

18. The combination of claim 15 wherein said vertical scan modification means includes film frame detector means associated with said means for continuously advancing a film of film frames through said film scanning zone.

19. The combination of claim 15 wherein said vertical scan modification means includes a film frame detector means and clock pulse generator means both associated with said means for continuously advancing a film through said film scanning zone and dual signal development means coupled to said film frame detector means and said clock pulse generator means for providing dual output signals representing positional location of successive film frames in said film scanning zone.

20. The combination of claim 19 wherein said dual signal development means provides output signals in the form of binary logic information.

21. The combination of claim 19 including staircase ramp signal development means coupled to each of said dual signal development means for dual output providing a pair of substantially identical staircase ramp signals each having a slope substantially proportional to the rate of advancement of film frame through said film frame scanning zone.

22. The combination of claim 19 wherein said dual output signals from side dual signal development means are in the form of binary information and said signal switching selector means switches from one to the other of said output signals in accordance with the positional location of a film frame in said film frame scanning zone.

23. Apparatus for deriving from a continuously moving film of film frames an image suitable for display on a color television receiver comprising in combination:

color television receiver means including a visual image display device and drive circuitry providing signals at horizontal and vertical scan frequencies and coupled to said display device;

flying spot scanner means including a flying spot scanner tube, film frame scanning zone, means for continuously advancing a film through the scanning zone, and image detection and processing means;

vertical scan modification means coupled to said vertical drive circuitry of said television receiver and said means for continuously advancing a film through said film scanning zone, said means providing a pair of time spaced signals each representing one of a pair of successive film frames in said film scanning zone;

signal selector means coupled to said vertical scan modification means and said vertical drive circuitry of said television receiver for switching from one to the other of said pair of time spaced signals in accordance with the positional location of a frame of film within said film scanning zone and during period of retrace of said vertical scan drive circuitry; and signal combining network means coupling said vertical scan drive circuitry and said signal selector means to said flying spot scanner means to effect electron beam scan modification at a rate substantially equal to the rate of movement of a film frame through said film scanning zone.

24. The combination of claim 23 including a switching means for selectively coupling signals from said flying spot scanner means and from a television signal receiver to said color television receiver to selectively effect a visual image display derived from film and from intercepted signals. cm 25. The combination of claim 23 including a second switching means coupled to said means for continuously advancing a film and said vertical scan modification means for effecting reversal of the vertical scan modification signals upon reversal of said means for continuously advancing a film.

26. The combination of claim 23 including means for coupling said horizontal drive circuitry to said visual image display device of said color television receiver and to said flying spot scanner tube of said flying spot scanner means.

PO-1050
(5/69)

UNITED STATES PATENT OFFICE
CERTIFICATE OF CORRECTION

Patent No. 3,604,850 Dated September 14, 1971

Inventor(s) Robert Roy Eckenbrecht, Charles Bailey Neal and Dong Woo Rhee

It is certified that error appears in the above-identified patent and that said Letters Patent are hereby corrected as shown below:

Column 2, lines 10 and 11 of the specification, please delete in the second instance--of a film movable at a given rate through a film scanning--.

Column2, line 22 "of television" should read--of a television--.

Column 3, line 6 "process" should read--processing--.

Column 3, line 67 "procession" should read--processing--.

Column 4, line 33 "caused" should read--causes--.

Column 5, line 7 "caused" should read--causes--.

Column 6, line 62 Please delete "varying magnitude representing a continuously varying"

Column 8, line 33 "caused" should read--causes--.

Column 11, line 2 of Claim 22 "side" should read--said--.

Column 12, line 15 of Claim 24 Delete "cm 25."

Column 12, line 16 of Claim 25 Insert--25.--.

Signed and sealed this 30th day of May 1972.

(SEAL)
Attest:

EDWARD M.FLETCHER,JR.
Attesting Officer

ROBERT GOTTSCHALK
Commissioner of Patents